United States Patent [19]

Edie et al.

[11] Patent Number: 5,334,414

[45] Date of Patent: Aug. 2, 1994

[54] PROCESS FOR COATING CARBON FIBERS WITH PITCH AND COMPOSITES MADE THEREFROM

[75] Inventors: Danny D. Edie, Clemson; James W. Klett, Seneca, both of S.C.

[73] Assignee: Clemson University, Clemson, S.C.

[21] Appl. No.: 8,787

[22] Filed: Jan. 22, 1993

[51] Int. Cl.⁵ .............................................. B05D 3/02
[52] U.S. Cl. .................................. 427/189; 427/228; 264/29.2
[58] Field of Search .............. 427/189, 228; 264/29.1, 264/29.2, 29.6, 29.7; 156/89

[56] References Cited

U.S. PATENT DOCUMENTS

| | | |
|---|---|---|
| 2,173,032 | 9/1939 | Wintermute . |
| 2,911,319 | 11/1959 | Peter . |
| 3,017,309 | 1/1962 | Crawford et al. . |
| 3,262,423 | 7/1966 | Willhite . |
| 3,299,853 | 1/1967 | Whitacre . |
| 3,462,289 | 8/1969 | Rohl et al. ............................ 117/46 |
| 3,698,095 | 3/1974 | Hall . |
| 3,839,072 | 10/1974 | Kearsey . |
| 3,914,395 | 10/1975 | Finelli et al. ........................ 264/29.7 |
| 3,944,686 | 3/1976 | Froberg . |
| 3,971,669 | 7/1976 | Wrzesien et al. . |
| 4,260,265 | 4/1981 | Faverty . |
| 4,554,024 | 11/1985 | Zimmer et al. . |
| 4,745,008 | 5/1988 | Plotzker et al. . |
| 4,902,453 | 2/1990 | Okura et al. ........................ 264/29.2 |
| 4,986,943 | 1/1991 | Sheaffer et al. ..................... 264/29.1 |
| 5,061,414 | 10/1991 | Engle . |
| 5,094,883 | 3/1992 | Muzzy et al. . |
| 5,123,373 | 6/1992 | Iyer et al. . |

OTHER PUBLICATIONS

Fabrication of 2-D Pan Fiber-Pitch Matrix Carbon-Carbon Composites Using Prepreg Technique, Takano et al., Proc. of the 8th Int. Conf. on Composite Materials, 22-C-1 to 22-C-11, 1991.
Temperature Dependence of the Thermal Conductivity of Carbon-Carbon Composites, Dinwiddle et al., 20th Biennial Conf. on Carbon, 1991.
The Influence of Raw Materials and Process on the Properties of Chopped Fiber Hot-Pressed c/c Composite, Li et al., 20th Biennial Conf. on Carbon, 1981, pp. 340-341.
Oxidation Stabilization of 2D-Pan Fiber-Pitch Matrix Carbon-Carbon Composites, 20th Biennial Conf. on Carbon, Takano et al., 1991, pp. 182-183.
"A Continuous Process for Powder Coating Carbon Fibers," Master's Thesis, Laurence Allen III, Aug. 1989.
Abstract: "Oxidation Stabilization of 2D-Pan Fiber-Pitch Matrix Carbon-Carbon Composites", Takano et al., Extended Abstracts and Program-20th Biennial Conference on Carbon, Jul. 1991.

(List continued on next page.)

Primary Examiner—Shrive Beck
Assistant Examiner—Erma Cameron
Attorney, Agent, or Firm—Dority & Manning

[57] ABSTRACT

The present invention is directed to a process for coating carbon fibers with a pitch material. The process employs a pressurized air-comb for spreading a carbon fiber tow into individual carbon fiber filaments and providing the carbon fiber filaments in a spreaded tow to a powder deposition chamber. A pitch material is dried and finely ground and is then fed into the coating chamber at a point above the traveling spreaded carbon fiber tow. The pitch powder initially falls onto the fiber tow and begins forming a uniform coating around the individual carbon fibers. After falling past the point of the traveling carbon tow, the pitch powder is then recirculated back to the upper portion of the coating chamber and is entrained within a pitch powder cloud through which the threaded fiber tow travels. Fibers that are coated by such a method may be used to form carbon/carbon composites that exhibit high strength and excellent mechanical properties. The carbon fibers that are coated according to the present invention do not require the repeated multi-impregnation steps normally associated with carbon/carbon composite formation.

10 Claims, 8 Drawing Sheets

OTHER PUBLICATIONS

J. D. Muzzy, Processing of Advanced Thermoplastic Composites, 27–33 and 38–39, Apr., 1988, Atlanta, Ga.
Application of Ductile Polymeric Coatings onto Graphic Fibers et al., Polymer Science Program, University of Connecticut, 1986.
Thermoplastic Coating of Carbon Fibers, B. W. Gantt et al., ASTM Symposium, Oct. 19–20, 1987, Bal Harbor, Fl.
A Thermoplastic Coating of Carbon Fibers, Thesis by Bradley Warren Gantt, May 1987.
Electrostatic Charging Characteristics of Polyethylene Powder . . . , Paul Cartwright et al., IEEE Transactions on Industry, vol. 1A-21, Mar./Apr. 1985.

PROCESS FOR COATING CARBON FIBERS WITH PITCH AND COMPOSITES MADE THEREFROM

FIELD OF THE INVENTION

A process for coating carbon fibers with pitch materials and the carbon/carbon composites made therefrom are provided.

BACKGROUND OF THE INVENTION

Carbon/carbon composites are presently used for various nigh-temperature applications. Because such composites are dimensionally stable and retain their strength up to 3000° C., they are an excellent material for areas where high temperature thermal protection is required.

The composites are used in applications such as the nose cap and leading edges of the shuttle orbiter where temperatures approach 3000° C. during atmospheric re-entry and exceed even the temperature limits of the protective ceramic tiles used on the other surfaces of the orbiter. Carbon/carbon composites have a near zero coefficient of thermal expansion and a high heat capacity and are non-ablative materials that can withstand the thermal shock of re-entry, going from −160° C. in the cold of space to 3000° C. Unlike the ablative heat shields used in early manned spacecraft, carbon/carbon composites can undergo thermal cycling thousands of times with little decrease in properties. Also, carbon/carbon composites can withstand the impact of small meteors traveling at thousands of miles an hour without fracturing or developing cracks. Because of this stability and toughness, the carbon/carbon composites on the shuttle do not need to be replaced after every mission.

Carbon/carbon composites are also used in aircraft engines because of their high temperature performance. Nozzle components on fighter engines are constructed from carbon/carbon composites, not only because they are lighter and stronger than conventional materials, but also because they can withstand the temperatures and forces exerted on them by the engine exhaust gases. In fact, unlike the titanium super-alloys typically used in these applications, carbon/carbon composites actually increase in strength as the temperature increases. The turbine rotors in these engines often are often manufactured from carbon/carbon composites because they perform well at such high temperatures, thereby increasing the engine's efficiency.

Unfortunately, even though these materials are very tough, their strengths heretofore have normally been insufficient to allow them to be used as load carrying members. Also, because carbon/carbon composites are difficult to process and expensive, their use in industry has been limited to applications where high temperature performance, rather than cost, is the concern.

Known carbon/carbon composites are typically manufactured by infiltrating a woven carbon fiber preform with a polymeric resin. The impregnated preform is then heat treated in an inert atmosphere under pressure to produce a carbon fiber structure bound by a carbonaceous matrix. The initial carbon/carbon composite formed by this method is very porous, with a density less than water, which leads to dimensional instability and low mechanical properties. To alleviate these problems, the porous composite structure must be subsequently re-impregnated with the polymeric resin and further heat treated to densify the composite. This densification step is repeated until a density of about 1.6 grams per cubic centimeter is achieved to produce a composite with the desired mechanical properties and dimensional stability at elevated temperatures. These densification steps usually take several months, however, to perform and, thus, limit the use of the carbon/carbon composites to projects where cost and time are not an issue.

Carbon/carbon composites contain a primary carbon filler that is normally in fiber form and secured by a secondary carbon matrix binder. Some of the earliest commercial carbon/carbon composites utilized polycrystalline carbon as the filler and a coke as the binder. The polycrystalline carbon gave the composite its high mechanical properties. In today's advanced carbon/carbon composites, desirable components include a high modulus carbon fiber as the filler and a mesophase carbon as the binder. Such advanced composites have strength-to-weight ratios that are well above those of metals and ceramics.

Currently in the manufacture of many carbon/carbon composites, the carbon reinforcing fibers are first woven or braided into a three-dimensional (3-D) preform. This 3-D structure of carbon fibers increases the interlaminar shear strength of the final composite. Next, the 3-D preform is infiltrated with a polymeric or pitch resin that serves as the matrix of the composite. Polymeric resins typically have very low carbon yields, ranging from 40% to 50%. On the other hand, the carbon yield for an isotropic pitch can be as high as 70% to 80% and that for a mesophase pitch can reach 80% to 90%. After infiltration, the impregnated structure is pyrolyzed at temperatures ranging from 800° C. to 1500° C. to drive off all substances except the carbon. Unfortunately, the gaseous volatiles create pores and bloat the composite as they escape, reducing both the density and mechanical properties of the composite. To fill these pores and improve the mechanical properties of the composite, several densification cycles must be performed as mentioned above.

Densification consists of re-impregnating the porous composite with the resin and again pyrolyzing. This procedure yields a densified carbon/carbon composite, suitable for high temperature structural applications. The repeated cycles, however, can take several weeks for a single composite depending on the resin used. Heretofore, polymeric resins have been considered more suitable for impregnation due to their lower viscosity, but the low carbon yield makes many costly densification cycles necessary. Obviously, if the cost of carbon/carbon composites is to be reduced, new methods of manufacturing must be developed.

Recently, carbon fibers have replaced polycrystalline carbon as the preferred filler in carbon/carbon composites because of their high strength and elastic properties. Carbon also exhibits higher mechanical properties in the fiber form than in the original bulk material. With brittle materials, like carbon, this increase in properties is caused by both an increase in molecular orientation and a decrease in strength-limiting flaws. The decrease in flaw density due to the reduction of the cross-sectional area, combined with the increase in molecular orientation, makes the mechanical properties of carbon fiber approximately 500 times greater than that of bulk carbon.

Today, two different types of carbon fiber are commercially available: polymeric-based and pitch-based. The most common polymeric carbon fiber is produced from polyacrylonitrile (PAN). Numerous PAN-based carbon fibers have reactive functional groups at the surface that can react with the matrix of the composite. The reactive surface and the rough skin texture of polymeric-based carbon fibers create a strong fiber/matrix interface in the composite through chemical and physical bonding. The strong interface permits stress to be transferred from the matrix to the fiber, an important characteristic for fiber-reinforced plastics.

Pitch-based fibers, however, are the desired fibers for use in carbon/carbon composites. Mesophase pitch-based carbon fibers exhibit a more ordered graphitic structure than PAN-based carbon fibers. Such ordered structures provides fibers that are less susceptible to oxidation. They also exhibit a variety of transverse microstructures (morphology). Different fiber microstructures can be produced by varying the spinning conditions of the liquid crystalline precursor. Because the fibers are melt spun, mesophase pitch-based fibers have a smooth surface. During subsequent pyrolysis, the fiber loses only 10% to 20% of its mass, causing little collapsing of the fiber surface. Thus, the surface of the final pitch-based carbon fiber is much smoother than that of PAN-based fibers. Unlike PAN-based carbon fibers, the final mesophase pitch-based fiber has very few reactive functional groups on its surface. Because of the less reactive fiber surface and the optically smooth skin, composites made from pitch-based carbon fibers exhibit weaker interfacial bond strengths than those formed using PAN-based carbon fibers. The problems created by the weaker interfacial bond strengths may be overcome by well-known techniques of surface treating or sizing the pitch-based fibers.

Two types of matrix precursors may be used to make carbon/carbon composites: (1) those that form "hard" carbon residues, and (2) those that form "soft" carbon residues. The hard carbons are a non-graphitizing residue and are formed by pyrolysis of a infusible precursor, such as a thermoset polymer. Because the precursor is highly networked and crosslinked, it is unable to reorient and form graphite crystals during pyrolysis, regardless of the heat treatment temperature. Because hard carbons do not have the preferred orientation of graphite, composites formed using hard carbon matrices tend to exhibit lower Young's moduli. The crosslinking, however, does provide for stress transfer between the graphite planes, thus leading to increased toughness of the matrix. High toughness of the matrix and a moderate Young's modulus are typical for all the hard carbons, whereas a high modulus and a shear sensitivity of the matrix are characteristic of soft carbons.

Soft carbons are formed by the liquid-phase pyrolysis of polyaromatic resins, such as pitch. During pyrolysis, at a temperature of approximately 400° C., aromatic polymerization converts any type of pitch matrix resin to a mesophase pitch, in which the larger polycarbon planes reorient themselves parallel to each other. These pre-oriented crystal-like regions of the liquid tend to coalesce, thus promoting crystallization and the formation of regions of perfect graphitic crystallinity upon further heat treatment. The adjoining layer planes within soft carbon are only weakly bound by van der Waals forces, making this material shear-sensitive. However, it is this weak interplanar bonding that allows the layer planes to reorient easily during pyrolysis.

Most raw pitches (Ashland 240, Ashland 260, etc.) are subjected to further processing prior to use as matrix resins in composites. These treatments increase the carbon yield of the pitch and, thus, reduce somewhat the number of densification cycles necessary during composite formation. Several grades of Aerocarb pitch are produced by the Ashland Petroleum Company by varying the heat treatment temperature and time. The product number (Aerocarb 60, 80, etc.) indicates the minimum coking value of the product.

When either polymeric or pitch matrix materials are used in conventional carbon/carbon composites, the resulting composites nearly always contain voids after pyrolysis. As previously mentioned, a major cause of porosity is insufficient wetting and/or inadequate infiltration of the precursor into the bundles of fibers in the preform. Usually the precursor is able to fill the large gaps found in a woven preform, but often it cannot infiltrate the small pores in the bundle, resulting in encapsulated regions of dry fibers. The resulting porosity is quite evident in green composites.

Another leading cause of porosity results from the differences in thermal behavior of the fibers and the matrix. Strong interfacial bonding in the green composite, combined with significant differences in the thermal expansion behavior of the matrix and fiber, can lead to fiber/matrix debonding during pyrolysis. The debonding creates stress concentrations during loading of the composite, resulting in premature cracking of the matrix and fracture of the fibers. Slow heating of the composite during carbonization somewhat alleviates, but does not eliminate, this problem.

The third and most significant cause of pore formation is mass loss during pyrolysis. As previously mentioned, during this heat treatment step the matrix precursor reacts and produces low molecular weight gaseous products, such as methane, ammonia, CO, and $CO_2$. These pyrolysis gases cause bloating of the bulk matrix (similar to foaming) and, thus, create the well-known high porosities. Once formed, these pores can only be filled by redensification of the structure. The porosity and, thus, the need for redensification can be reduced by using a matrix precursor with a high carbon yield, thus reducing the amount of gases given off during pyrolysis.

Another technique to decrease bloating is through crosslinking or stabilization. If the matrix can be crosslinked prior to pyrolysis, bubbling and bloating can be minimized and increased carbon yields can be obtained. Even in crosslinked matrices, however, significant weight loss still occurs during pyrolysis, leading to shrinkage of the matrix and microcracking. The microcracking mechanisms typically observed in composites are delamination and fold-sharpening, characterized by shrinkage, distortions, and layer-rupture acting on the curved layer of the mesophase sheath around the fibers. This leads to fiber/matrix debonding and separation (delamination) of the graphitic layer planes in the matrix.

Carbon/carbon composites are normally formed from polymeric resins in the following general manner. First, a carbon fiber/polymeric composite is fabricated, either by wet-winding a one-dimensional (1-D) or two-dimensional (2-D) structure, or by melt-impregnating a multidimensional preform. Multidimensional preforms are preferred because they minimize the bulk matrix shrinkage during pyrolysis and improve the interlaminar shear strength of the final composite. Following impregnation, the preform is cured in an autoclave to form the green composite. The green composite is then carbonized in an inert atmosphere at temperatures ranging from 800° C. to 1500° C. to yield a hard carbon residue. During this step, the volatiles escape, thus creating a porous composite that, heretofore, have contained as much as 30% voids, by volume. The porous structure formed thereby is then densified by melt impregnation with additional resin, followed by subsequent recarbonization. As many as five densification cycles may be performed, requiring several weeks or months to achieve desired porosities of less than 5%.

Chemical vapor infiltration (CVI) is another technique commonly used to densify the porous structure. With CVI, a carbon-rich atmosphere is created by cracking hydrocarbon gases at temperatures ranging from 1000° C. to 2000° C. The preform is placed in this atmosphere and maintained at a slightly lower temperature than the surrounding atmosphere which causes the carbon to precipitate onto the preform and create a carbon matrix. This method is extremely expensive, time consuming, and difficult to control.

When pitch resins are employed, the matrix must be oxidized in order to prevent bloating as the pyrolysis gases evolve during carbonization. With mesophase pitch, the oxidation also serves to preserve the orientation of the crystallites while in the liquid crystalline state. In order to effectively crosslink the carbon layers, the pitch is oxidized for many hours (50 to 100) at temperatures slightly below the softening point. The oxidized composite is then carbonized at temperatures from 800° C. to 1500° C. in an inert atmosphere. Even though volatiles and pyrolysis gases still can create some porosity, the oxidation step lowers the porosity levels to between 10% and 20%. In such prior art processes, the composite is densified to the desired level by repeated melt impregnations or CVIs.

High carbon-yield pitches usually have higher viscosities than the phenolic resins used for carbon/carbon composites. Such high viscosity, however, makes it difficult to fill pitch into the fine pores within the bundles of fibers, resulting in a slightly higher porosity. However, because composites formed using high carbon-yield pitches require fewer redensification cycles, this increase in porosity has previously been tolerable.

Even though impregnation can be difficult, pitch resins easily wet carbon fibers and provide good adhesion. However, the difference in the thermal expansion behavior of the fiber and the pitch makes strong bonding at the fiber/matrix interface detrimental to the formation of the composite during repeated densification. Pitch has a positive coefficient of thermal expansion, while the fiber has a negative coefficient of thermal expansion. Thus, stresses develop and remain in the composite after processing. If interfacial bonding is strong, the stresses will be relieved by matrix cracking and/or fiber failure. Debonding also will occur, increasing the porosity of the composite. The smooth, unreactive surfaces of mesophase pitch-based carbon fibers, however, reduce adhesion. As a result, mesophase pitch-based carbon fibers are used in most advanced carbon/carbon composites. Many of these problems would be alleviated if a composite forming process that eliminates the repeated densification cycles was available.

At present, the high cost of carbon/carbon composites precludes their use in high-volume applications. Although carbon/carbon composites are more suitable for many applications, lower cost materials, such as ceramics, are selected. In order for carbon/carbon composites to compete with ceramics and enter high-volume markets, their manufacturing costs must be drastically reduced. A need exists for a technique to reduce the number of densification steps and thereby reduce the cost of carbon/carbon composites. The present technique overcomes these and other shortcomings of the prior art by utilizing a continuous powder coating process to produce a pitch-based towpreg that can be fabricated readily into thick-walled woven carbon/carbon structures.

SUMMARY OF THE INVENTION

It is an object of the present invention to provide a process for coating carbon fibers with a pitch material.

It is further another object of the present invention to provide a process for coating a carbon fiber towpreg with a high carbon yield resin.

It is further another object of the present invention to provide a carbon/carbon composite made from carbon fibers with pitch as the matrix.

It is further another object of the present invention to provide an improved coating method for coating carbon fibers.

It is further another object of the present invention to provide an improved coating chamber for coating carbon fibers.

It is further another object of the present invention to provide an improved pitch material for coating onto carbon fibers.

It is further another object of the present invention to provide an economical and efficient method of producing carbon/carbon composites.

It is another object of the present invention to provide an improved tow spreader for spreading carbon fibers being fed along a carbon fiber coating line.

Generally speaking, the present invention is directed to a method of coating carbon fibers with a pitch material. The pitch-coated carbon fibers may then be formed into improved carbon/carbon composites. The process employs a unique powder coating chamber. In the process, the pitch powder is initially ultra-dried and then fed into the powder coating chamber at a point that allows the powder to fall freely onto and past the moving fiber tows. A centrifugal fan blows the freefalling powder back toward the fiber tows and creates a pitch powder cloud that envelopes and uniformly coats the moving carbon fiber tows.

Prior to entering the powder coating chamber, the carbon fiber tows are effectively spread so that each individual filament may be uniformly coated by the powder coating process. The unique tow spreader employs a modified air-comb that induces fiber spreading with pressurized air. The modifications allow the filaments to be blown out the side of the spreading section and thereby reduce filament damage while spreading the fibers evenly.

When using both Aerocarb 80 and Mitsubishi AR mesophase pitched-based matrices, the present process yielded a composite with a high porosity and low density of 1.0 grams per cubic centimeter after unrestrained carbonization of up to 1200° C. Microscopic inspection of the composites' cross sections revealed a sheath-like qraphitic structure in the matrix around fibers for both the AR mesophase and Aerocarb 80 composites. The average flexural modulus of the Aerocarb 80 composites and the AR mesophase composites was found to be 99 GPa and 63 GPa, respectively. The average flexural strength of the Aerocarb 80 composites and the AR mesophase composites was found to be 113 MPa and 117 MPa, respectively. The towpreg was then fabricated into unidirectional composites with flexural properties that compare favorably to those produced by traditional impregnation techniques. Because of its high flexibility, the towpreg lends itself to faster and less expensive methods for fabricating carbon/carbon composites.

DESCRIPTION OF PREFERRED EMBODIMENTS

The present invention employs a novel process of towpreg formation, suitable for manufacturing 3-D carbon/carbon composites. Both isotropic and mesophase pitch powders are suitable matrix binders, and PAN-based or pitch-based carbon fibers and the like may be used as the filler. One such isotropic pitch, Aerocarb 80, was obtained from Ashland Chemical Company, and a 100% mesophase pitch was supplied by the Mitsubishi Gas Chemical Company for running in the present process.

Figure 1:
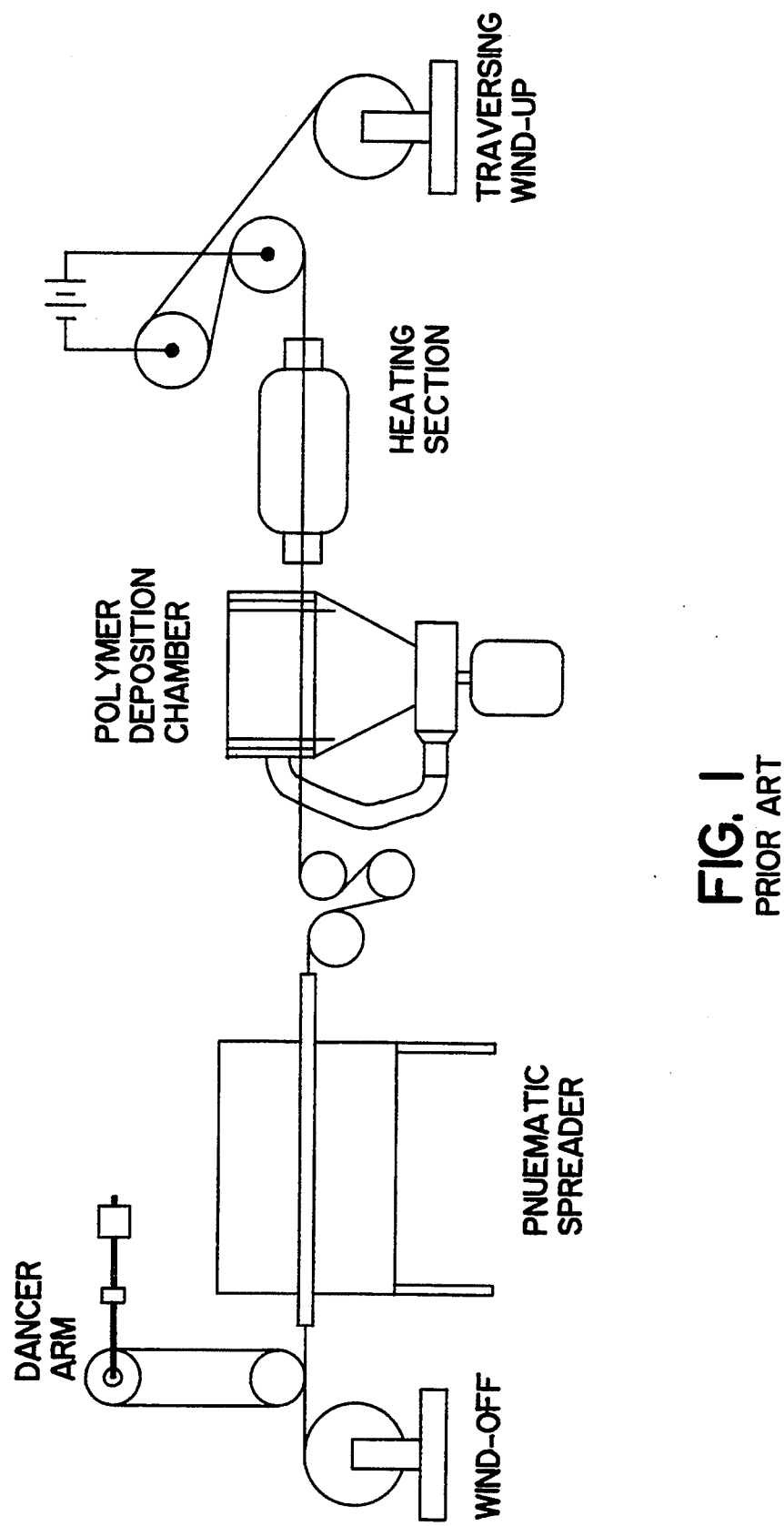
FIG. 1 is a schematic illustration of a prior art fiber coating process developed by Laurence Allen.

The present inventive process employs a uniquely modified version of a previous fiber coating process developed by Laurence E. Allen at Clemson University. The Allen process had been used to coat carbon fibers with a thermoplastic polyimide. This high-viscosity thermoplastic matrix resin was coated onto carbon fibers by employing a pneumatic fiber spreader to separate the individual fibers, a recirculating powder coating chamber, and a heating process consisting of a combination of direct electrical resistance and convective heating as shown in FIG. 1. Using this process, Allen was able to produce a thermoplastic-coated fiber towpreg that was flexible enough to be woven, braided, and knitted into multidimensional textile preforms.

The present invention relates to an improvement over the Allen process by allowing continuous formation of carbon fiber towpreg for fabrication of 3-D pitch-based carbon/carbon composites that eliminates the infiltration problems commonly encountered when pitch is used in conventional fabrication techniques. In the present inventive process, which is illustrated schematically in FIG. 6, a wind-off mechanism, a dancer arm, and a traversing wind-up are used to pass the tow through the towpreg coating line at a constant speed and tension. The wind-off and the wind-up spools are driven by variable speed electric motors. Tension on the tow during processing is adjusted by varying the position of the dancer arm balance weight. The wind-up motor is set at a fixed speed, and the tow tension held constant by varying the speed of the wind-off motor by employing a potentiometer for sensing the position of the dancer arm and generating an electrical feedback signal to control the speed of the wind-off motor.

Figure 2:
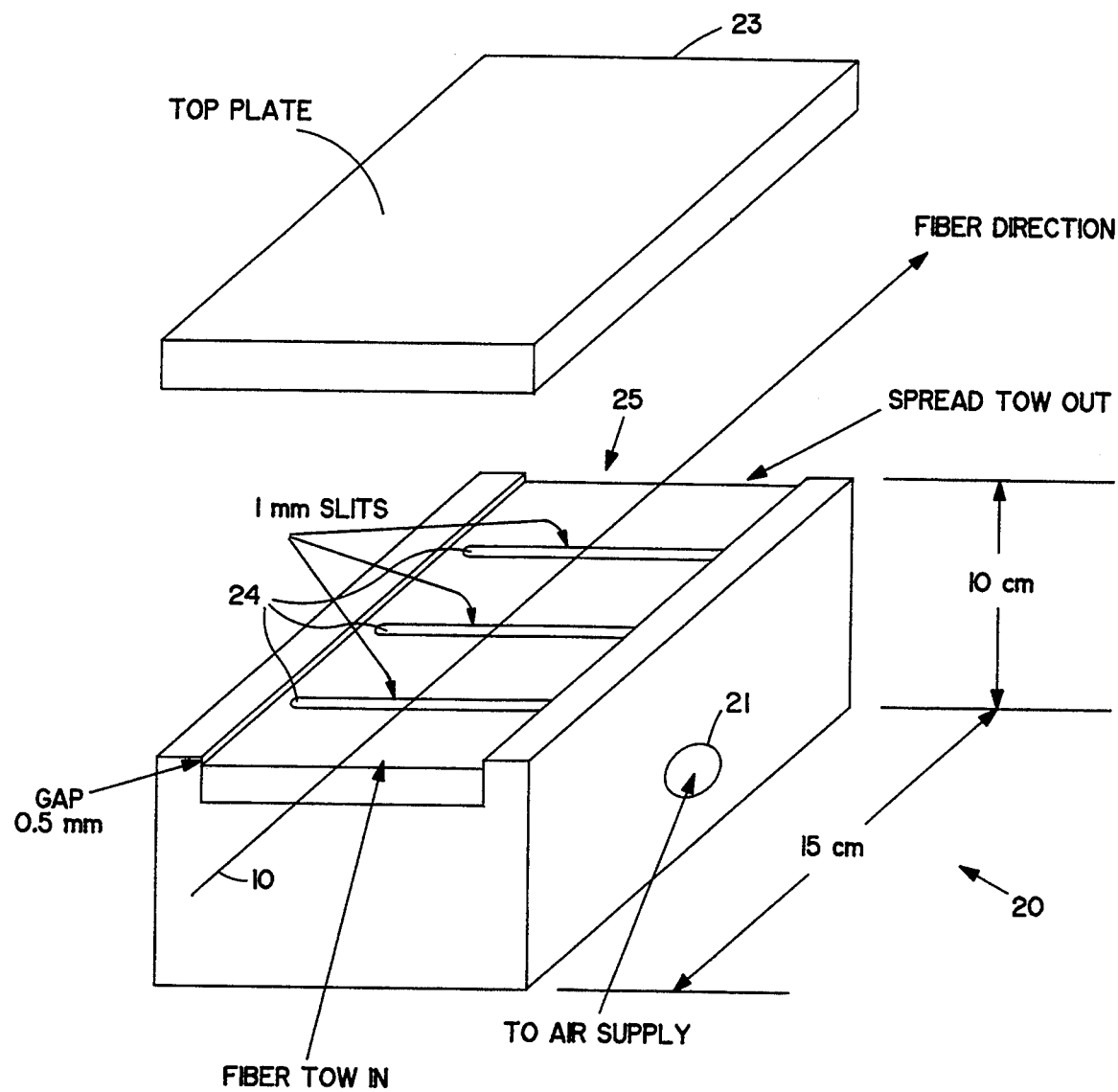
FIG. 2 is a perspective view of the fiber tow air-comb spreader employed in the present process.
Figure 6:
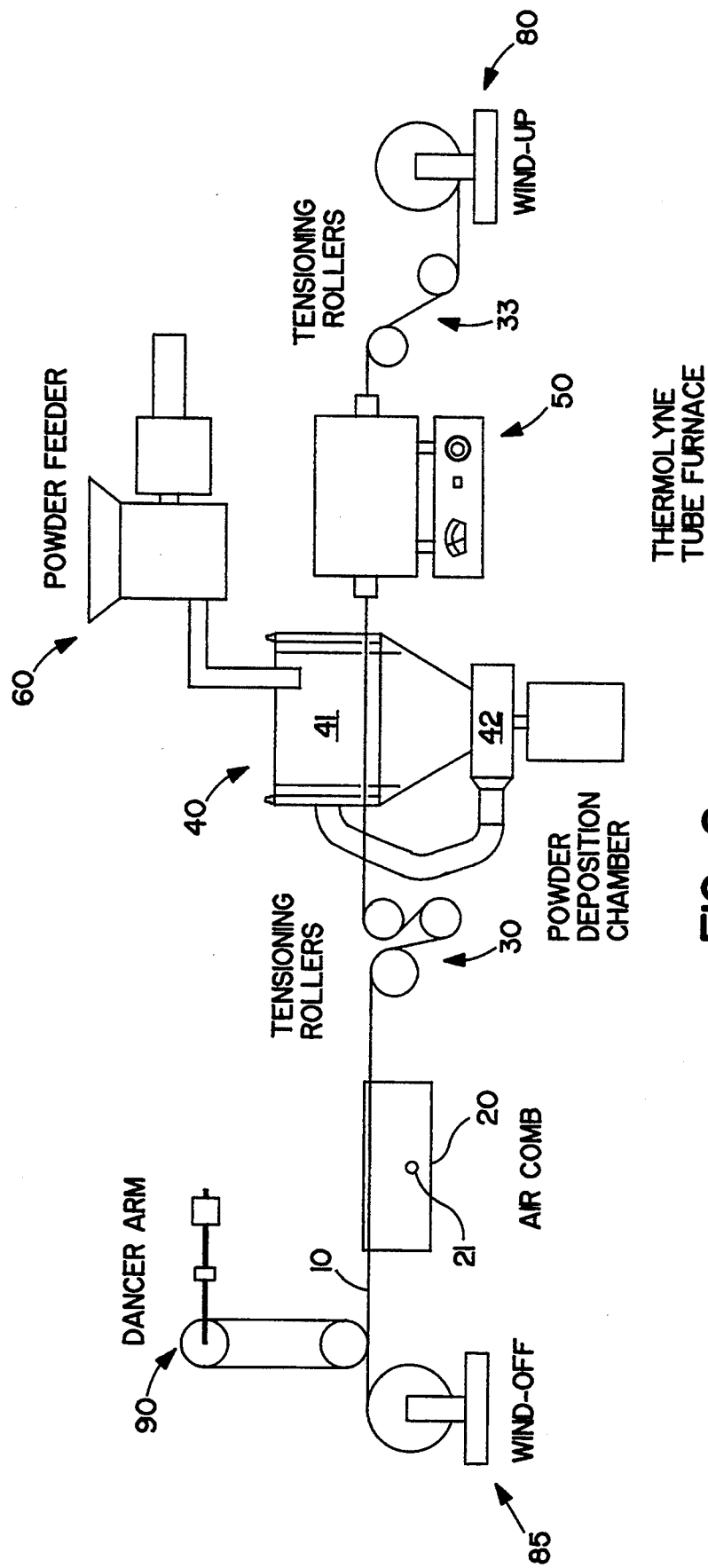
FIG. 6 is a schematic illustration of the powder coating line employed in the present process.

The air-comb spreader 20 shown in FIGS. 2 and 6 is utilized to spread the tow. Air pressure is applied to the center chamber through opening 21 into the device, and subsequent lateral motion of the air forces the tow 10 to spread. After leaving the spreader 20, tow 10 may pass over one or more tensioning rollers 30 to maintain even spreading.

Next, the spreaded tow enters a powder deposition chamber 40 where it is coated with dry pitch powder. The powder is fed into an upper portion 41 of chamber 40 that allows it to free fall toward the fiber tow. The powder is then fluidized by a centrifugal fan 42 mounted under the chamber in a position beneath the moving fiber tow 10, resulting in a constant pitch powder cloud density and thus providing a consistent rate of polymer deposition on the spreaded tow 10. A powder extruder allows replenishment of the powder in the chamber during operation.

In Allen's previous process, a combination of convective and electrical resistance heating was utilized to adhere the polymeric matrix to the fibers. First, the tow was passed through a convection oven to pre-melt the polymer to the fibers and prevent build up of polymer on the two gold-plated electrical rollers over which the tow passed. The gold-plated rollers carried a potential of 45–49 volts applied across them.

To improve the control of powder melting, two changes were made to the heating section of the coating line and are part of the present inventive process. Earlier versions of Allen's convection tube furnace were replaced with a Thermolyne® model 21100 tube furnace 50 that can be heated to a temperature from 150° C. to 1200° C. and is equipped with an analog meter for monitoring the centerline temperature of the furnace and permitting better control of the heating conditions. The second change to the heating section was the removal of the gold-plated rollers. Because molten pitch tends to readily adhere to most surfaces, heating by electrical contact rollers would have been impractical for pitch coating.

Allen's process also resulted in operators having to continuously monitor and adjust three critical devices in the coating line: the tow spreader, the deposition chamber, and the powder feeder. The tow spreader in these prior art devices and processes failed to consistently spread the fibers and the previously-employed deposition chambers often coated the tow unevenly, creating a stiff towpreg. Finally, the powder feeders required continuous monitoring and adjustment because of two deficiencies: it clogged easily, and it had a limited capacity. The present inventive process and apparatus utilizes the modified apparatus to facilitate towpreg formation and improve the uniformity of the coating.

For the individual fiber filaments to be coated evenly with pitch, the tow should be spread uniformly without damaging the fibers. Allen's attempts to spread the fibers employed a convex roller system and consecutive s-wraps to spread the tow. This technique managed to flatten the tow, but the spread was insufficient to allow the filaments to be individually coated, which is very important when using pitch as the coating matrix. In addition, devices ranging from thin rollers to thin razor blades have been utilized in the past in attempts to spread the tow, but all have generally produced inadequate spreading and excessive fiber damage.

Allen employed a pneumatic tow spreader wherein the tow entered through 0.64 cm high by 0.6 cm wide slot, passed through a section where the tow was spread to a width of 5 cm and then exited through a 0.64 cm high by 5 cm wide slot wide. Air entered Allen's spreader primarily through the exit slot and flowed parallel to the fiber tow before being pulled into the vacuum openings. Lateral motion of the air toward the vacuum openings tended to spread the fibers with only limited fiber damage. However, when any twist was encountered in the tow, the fibers split into two bundles, which were then drawn toward the sides of spreader. While such a device may have been more reliable than earlier tow spreaders, Allen's spreading remained somewhat uneven, lending to fluctuations in the uniformity of the coated tow.

In the present process, the air comb 20 used to spread the tow 10 comprises a modified version of an air-comb developed by Imperial Chemical, Inc. to induce fiber spreading with pressurized air. The tow spreading section of air-comb 20 is 6 cm wide by 15 cm long with a height of 0.5 mm. Of course, such dimensions are not critical to the present process. The Imperial air-comb was modified so that the filaments could not be blown out the side of the spreading section 25. The pre-modified comb device generated a great deal of filament damage and could not spread the fibers evenly. Accumulating of damaged fibers in the spreader made it necessary to stop the coating line and clean the spreader with friction being the culprit.

Figure 3A:
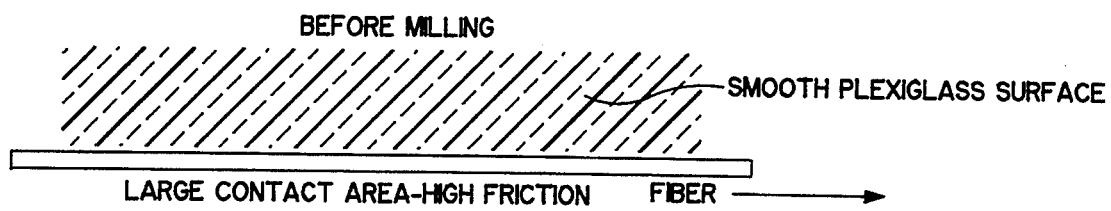
FIGS. 3A and 3B are sample illustrations of the two spreader walls shown in FIG. 2 before and after modification.
Figure 3B:
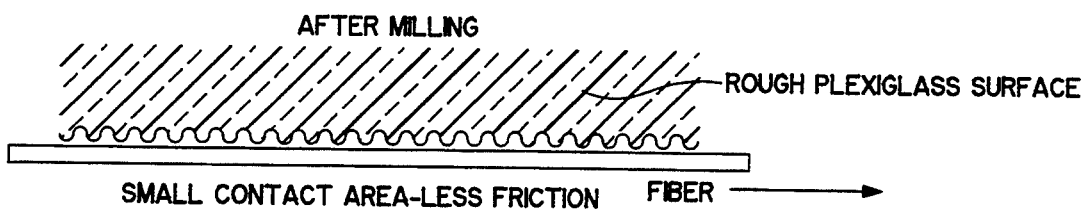

To eliminate the friction, 0.03 mm was milled from the Plexiglass ® chamber walls, resulting in a macroscopically smooth, but microscopically ridged, surface as illustrated in FIG. 3. The ridging was smooth enough not to break the fibers, but rough enough to reduce the surface area contacted by the fiber. This reduced friction and, thus, produced a continuous, uniform spread of the carbon fiber tow. Later, it was found that sanding with a 200 grit silicon-oxide paper produced the same effect. Moreover, the spreading was insensitive to the tow speed and tension and, thus, allows changing of the tow speed without adjusting the spreader. The resulting spreader allowed consistent spreading of 3K, 6K, and 12K tows.

Figure 4:
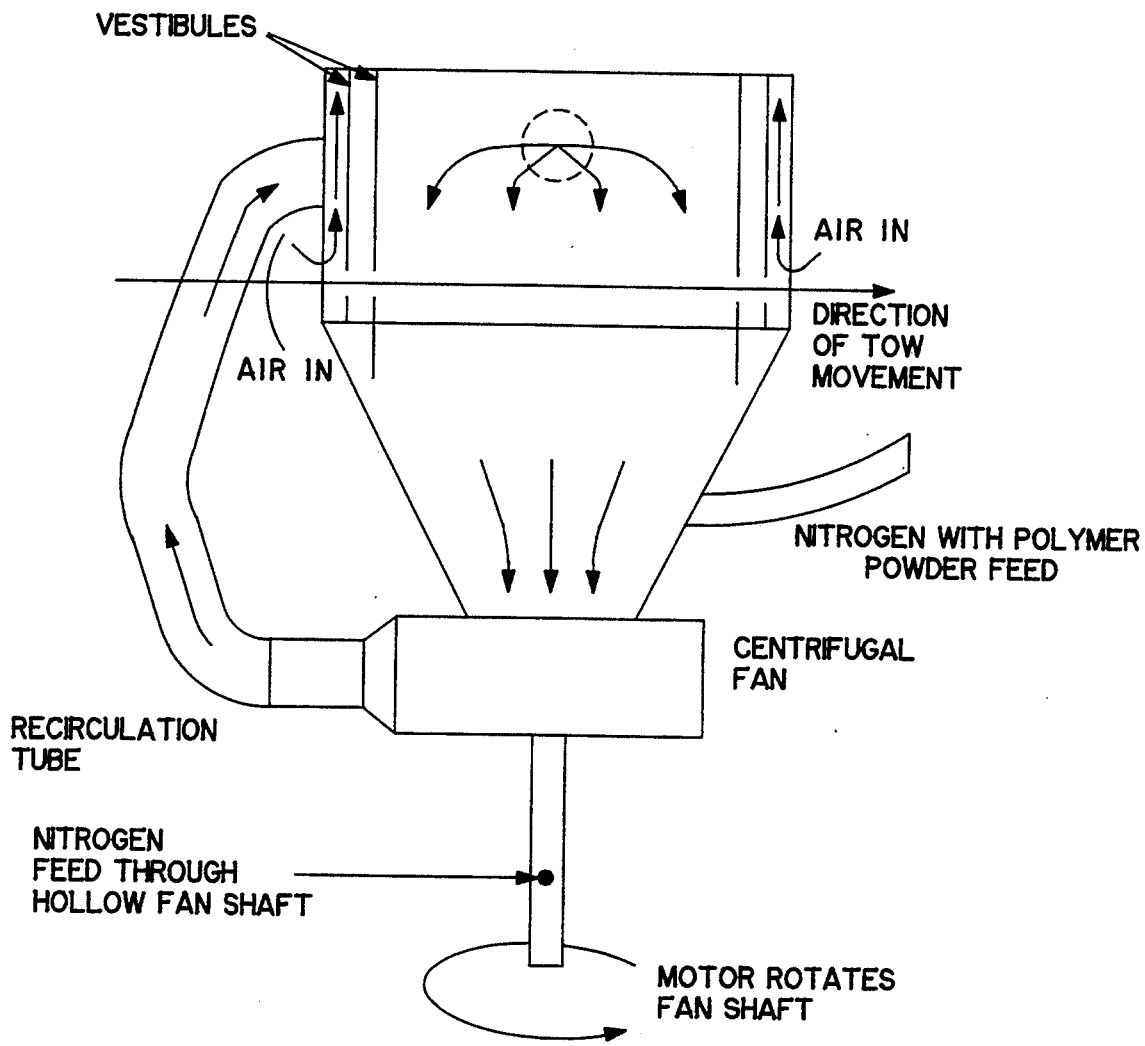
FIG. 4 is a schematic illustration of the prior art powder coating chamber employed by Allen.

The previous powder coating chamber employed by Allen is shown in FIG. 4. The chamber consisted of a fluidizing chamber and a recirculating fan. A nitrogen feed system supplied powder to the bottom of the chamber under the fiber tow where the low air velocity allowed the powder to fall into the recirculating fan, become fluidized and return to the chamber and coat the tows. The spread fiber tow entered the chamber through a 0.6 cm high by 5 cm wide opening and then passed through the fluidized cloud of powder where natural static charges promoted adhesion of the powder to the individual filaments. The vestibules reduced the velocity of the powder near the entry and exit openings and, thus, slightly minimized powder loss from the chamber.

Such coating chambers encountered two problems during continuous operation. Moisture and static charge lead to a buildup of powder on the chamber walls which would flake off and fall onto the recirculation fan. These large flakes remained intact and eventually became deposited on the fibers, producing stiff sections of towpreg. Additionally, the powder tended to agglomerate into clumps with diameters ranging from 50 to 100 mm. These large clumps forced operators to increase air velocity in order to maintain fluidization. The increased air velocity, however, damaged the fibers and blew the powder off of the tow, limiting the amount of coating to about 50% by volume. Moreover, the increased air velocity tended to blow powder out the openings of the chamber.

Figure 5:
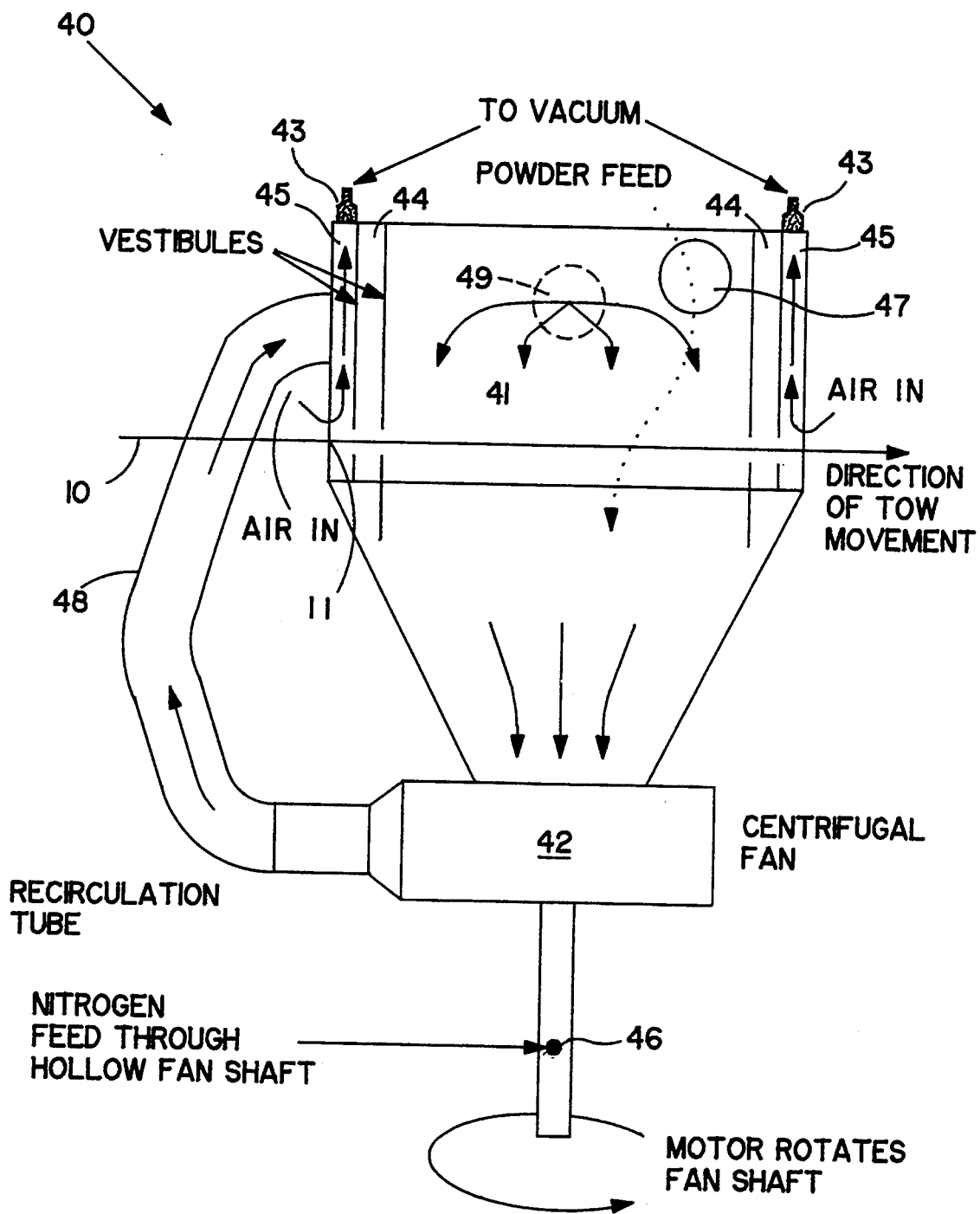
FIG. 5 is a schematic side view of the powder coating chamber of the present invention.

The present process employs the chamber 40 shown in FIGS. 5 and 6 which has glass sidewalls and additional vacuum ports. The glass walls tend to dissipate any static charge, thus reducing the buildup of powder on the chamber walls. Vacuum ports 43 are located in the space between the first vestibule 44 and the chamber entrance and exit openings (the location where the powder velocity is at a minimum). In previous designs, the vacuum opening was located in the bearing housing at the bottom of the circulation fan 42, which pulled air into the chamber, significantly reducing the powder loss from the chamber. The previously-employed vacuum also pulled powder into bearing, causing the fan to vary in speed and, sometimes, even stall.

The presently employed chamber design pulls vacuums close to the entry and exit openings of the chamber, rather than at the fan bearing, which minimizes powder loss from the coating chamber. The present chamber allows very little powder to collect in the bearing housing and very little powder is lost to the environment. Nitrogen is also introduced through the bearing housing 46 to inert the dust cloud and to prevent powder build up in the bearings.

The chamber design has a powder feed opening 47 through which the dried pitch powder is fed. The pitch enters the coating chamber 40 at its upper portion 41 above fiber tow 10 and then immediately falls toward the fiber tow and the centrifugal fan 42. The centrifugal fan fluidizes the powder and recycles it through conduit 48 and opening 49 back to the upper portion 41 of coating chamber 40. Coating of the tow with pitch powder that has not been fed through the centrifugal fan initially acts to assist in the uniform coating of the fiber tow and allows better control of such coating.

The powder feeding mechanism of the Allen coating line shown in FIG. 1 was also modified. The previous feeder consisted of a screw auger that utilized a stream of nitrogen to convey the powder to the coating chamber. The nitrogen also served to inert the fluidized cloud in the chamber, preventing a dust cloud explosion. This system required manual adjustment approximately every five minutes to maintain a constant flow rate. Also, the small feed hopper of the device limited the amount of tow which could be coated continuously. For example, in coated tows that were 50 volume percent fiber, only 88 meters of a 3K tow could be coated without stopping the line and refilling the powder feeder.

Obviously, if tows are to be coated in lengths longer than 100 meters (the minimum needed for knitting), a new feed system was required. A dry powder screw feeder 60 manufactured by the K-tron Corporation is employed in the present system and the speed of the screw feeder is regulated with a Fincor model 2300 DC motor controller.

As discussed above, another aspect of the present invention allows the feeder to feed powder into the side of coating chamber 40. As the powder exits the tube, it enters the chamber 40 in an area in the upper portion 41 with low air velocity. The 25 mm open-flight, center-rod screw of the K-tron feeder is specifically designed to provide the low feed rate required by the present coating line, and the 10 liter hopper of the K-tron feeder provides adequate capacity. The Fincor motor controller operates from 1 to 100 rpm, allowing the feed rate of the K-tron to vary from 7.13 cm$^3$/min to 71 cm$^3$/min.

Prior to trial runs of coating carbon fibers with pitch, the relationship between the oven temperature, the residence time of the tow in the furnace, and the pitch temperature was estimated. Because the goal was to produce pitch towpreg that could be woven or braided, it was critical that the heating section bond the pitch particles to the fiber sufficiently to prevent loss during subsequent textile processing. To ensure proper bonding, the pitch particles had to be heated to at least their softening temperature. Additionally, once softened, the particle must then wet the fiber surface. The powder and the fiber are heated by a combination of radiation and convection heat transfer as the coated tow enters the tube furnace 50. However, convection at the surface of the tow and conduction within the coated tow itself create resistance to heat transfer. Convection heat transfer to the fiber tow controls the rate of heat transfer which allows modeling of the powder coated tow as a radially-lumped system.

The softening points for the pitches employed herein are approximately 250° C. When the furnace temperature is 300° C. (corresponding to a setting of 270° C. on the analog meter) a fiber tow coated with 50% Aerocarb 80 or 50% AR mesophase pitch particles by volume heats to 290° C. within 1.61 seconds. In other words, even at the maximum processing speed, the pitch will be heated to a temperature nearly equal to that of the furnace before exiting the heating section. Thus, during coating trials the tube furnace was set at approximately 300° C. to ensure that the pitch melt viscosity was reduced to less than 150 Pa-s to permit the pitch to flow.

For the coated tow to be woven or knitted with a minimum loss of powder, the individual particles must fuse and wet the surface of the tow once the pitch powder reaches its softening point. Additionally, for the coated tow to retain maximum flexibility, the particles must wet the individual fibers within the tow. The optimum wetting time was calculated to be 0.065 seconds for the Aerocarb 80 and 0.043 seconds for the AR mesophase. These calculations assumed a contact angle of 30 degrees, which was conservative for the pitch used. Because the wetting and fusing times are insignificant compared to the heating time, the total residence time in the oven is determined by the time needed to heat to the desired temperature. For both pitches this value was calculated to be approximately 1.7 seconds and the optimum residence time was determined to be approximately 5.6 meters per minute. However, because the calculation of the heating time included a radiative heat transfer coefficient that was estimated very crudely, a line speed of only 4.0 meters per minute was employed in the trial runs in order to guarantee that the tow was uniformly heated to the desired temperature of 290° C.

In the present process carbon/carbon composites may be fabricated without the normal impregnation step. By way of example only, unsized Amoco T-300 PAN-based carbon fiber was coated with Aerocarb 80 isotropic and Mitsubishi AR mesophase pitches. Next, the coated towpreg was placed in molds and thermoformed into unidirectional composites. The composites were divided into two groups. One set of composites was subjected to oxidative stabilization, and the other set served as a control. Following this step, both sets of composites were carbonized in an argon atmosphere at a temperature of 1200° C. Finally, the carbonized carbon/carbon composites were cut into specimens and subjected to optical evaluation and flexural testing.

Fiber and Powder Preparation

The carbon/carbon towpreg was produced using the powder coating line shown in FIG. 6. This involved adjusting the fan speed, as required, to control the deposition rate and monitoring the fiber spreader 20 to detect any clogging or fiber breakage. The procedure to operate the coating line is outlined below.

The isotropic and the mesophase pitches were reduced to a particle size ranging from 5 to 20 microns which could be easily fluidized for use in the powder coating process. The pitches were ground into a fine powder and sifted through a 200 mesh screen while collecting the powder that did not sift through the screen. The powder that did pass through the screen was sifted using a 100 mesh screen. The average particle size of the material which passes through this sieve should be approximately 20 mm. If necessary, the average size may be verified using a particle size analyzer.

Next, the pitch powder was dried in a vacuum oven at a temperature of between about 150° C. and 175° C. for at least 8 hours while holding the vacuum at 25 inches mercury and mixing the powder at two hour intervals. The Thermolyne ® oven 50 was preheated to a centerline temperature of 290° C. A 27.9 cm long by 7.6 cm diameter empty spool was placed on the wind-up assembly 80 and a spool of unsized zero-twist T-300 PAN-based carbon fiber was placed on the wind-off assembly 85 so that the fiber off-winds from the top of the spool, rather than from the bottom.

The cut end of the tow was taped to avoid splitting and the wind-off spool was rotated to obtain about 1 meter of slack in the tow. The tow was threaded around the dancer arm 90 and rollers 30.

Tow Spreading

Next, the top plate 23 of the air-comb spreader was removed and the tow placed over the air-comb silts 24. The tow 10 was taped to the tensioning rollers 30 just past the air-comb and the top plate 23 on the air-comb was replaced. The tow 10 was threaded through the tensioning rollers 30 and attached to a 60 cm steel rod.

The rod with tow was passed through the opening 11 in the powder deposition chamber 40 and, then, through the oven 50. The tow was then removed from the rod. The tow was threaded through the second set of tensioning rollers 33 and passed through the ceramic pigtail guide and under the graphite guide roller and fastened to the wind-up assembly 80. The wind-up assembly 80 was rotated manually to remove any slack from the line.

Towpreg Coating

The feed hopper of the K-tron ® feeder 60 was charged with the dry pitch required for the coating trial. After achieving the desired line speed, the pressure of the nitrogen feed to the deposition chamber was set at 128.9 KPa (4 psig) and the nitrogen flow rate to 0.8 SCFM on the rotameter. Power was then supplied to the vacuum, the fan and the wind-off and wind-up motors to begin the coating process.

Two varieties of towpreg were produced following this procedure. One type consisted of Amoco T-300 unsized PAN-based carbon fiber coated with Aerocarb 80 isotropic pitch powder and the other consisted of carbon fiber coated with Mitsubishi AR mesophase pitch powder.

Composite Layup

All of the carbon/carbon composites were assembled and consolidated using a conventional wrapping mandrel to facilitate lay-up of the coated tow. A spool of the coated tow was mounted on a horizontal bar and the coated tow attached to one of the towpreg guides of the wrapping manual mandrel. Twenty towpreg strips were applied to the mandrel and the necessary strips to form a composite with the desired cross section were used. The mandrel was then placed over the mold so that the tow strips were laid in a U-shaped mold. The mold plunger was pressed down the strips until the desired layup was achieved.

Temperature Press

After lay-up, a Carver-high temperature press, was used to consolidate the two types of towpreg formed hereby. The top and bottom platens on the press were set at 280° C. and the hydraulic controller was set so that the load applied was 3,000 pounds of force. The composite was then placed in the press and held for about two hours. When the thermowell temperature reached 125° C., the composite was removed from the press and then cooled at room temperature.

Composite consolidation produced two types of green composites: in one, the matrix material was an isotropic pitch (Aerocarb 80), in the other, the matrix material was an anisotropic pitch (AR mesophase). Each of these two types of composite was separated into two groups. In order to investigate the effect of matrix stabilization on the properties of each type of composite, one group was subjected to oxidative stabilization prior to final carbonization, and the other group was carbonized without being stabilized.

Stabilization

Stabilization consisted of exposing the composites to air at temperatures ranging from 175° C. to 200° C. for up to 100 hours. In particular, stabilization was achieved by placing the composites in a convection oven at 175° C. to 200° C. for 96 hours. The composites were weighed at regular intervals to determine the percent mass gain of oxygen. The average mass increase of the two groups of composites subjected to oxidative stabilization was approximately 0.6%.

A flat wire mesh was used to ensure adequate convection of oxygen to all the composite surfaces in the vacuum/convection oven. The desired mass gains were calculated and then reached by continued stabilization processes.

Carbonization

Both the stabilized and unstabilized composites were carbonized as follows. Carbonization was performed in a high temperature Lindberg® heavy duty ceramic tube furnace. To prevent high temperature oxidation of the specimens, the furnace was purged with dry argon during carbonization. To minimize microcracking and the formation of slit pores (caused by the differences in thermal expansion of the fiber and the pitch), the furnace was heated to a final carbonization temperature of 1200° C. at a rate of 0.5° C./min.

Characterization

The void fraction of the carbonized specimens was determined by physical and optical characterization. Optical evaluation of the composites to determine the void fraction involved two steps: polishing a composite cross section and microscopic evaluation.

The development of graphitic order in the direction of the fibers is desired for a high translation of the fiber strength to the composite properties. Microscopic examination under cross-polarized light was conducted to reveal the development of parallel alignment of the layer planes in the direction of the fibers.

A major problem associated with tensile testing of the carbon-carbon composites is that the porous structure causes the specimen to fail prematurely at the grips due to grip pressure. Because of this, a common method for characterizing the mechanical properties of carbon/carbon composites is the three-point bending flexural test denoted as American Standard Testing Method D 790. This test can determine the flexural modulus, the flexural strength, and the interfacial shear strength of the composite. When performed correctly, this test will yield flexural modulus and flexural strength values that approach the tensile modulus and strength.

The results from various physical and mechanical characterizations of the carbon/carbon composites produced by the present inventive process are presented below. Characterizations were performed after each step of the fabrication procedure. The towpreg was evaluated for its flexibility, uniformity, and the degree of adhesion of the powder coating. Next, the composites, in the green state, were characterized by their void content. Then, the amount of oxygen absorbed during stabilization was determined by measuring the mass of the composites before and after stabilization. After carbonization, the final bulk density, porosity, volume change, and carbon yield were determined for each composite. Finally, the microstructure of the composites was analyzed and the mechanical properties of the composites were evaluated.

Towpreg Flexibility

As previously indicated, flexibility is critical if the towpreg is to be woven or braided into a 3-D structure. Previously, an uncoated 3K tow could be tied into knots 3 mm in diameter without any wrinkles or fiber breakage. The tow coated by Allen with the thermoplastic resin at a fiber fraction of 60% could be knotted to 5 mm in diameter. With the present process, the uncoated 6K tow could be tied into a 4 mm knot without any wrinkles or fiber breakage. The towpreg coated with Aerocarb 80 at a fiber fraction of 60% could be tied into knots slightly larger than 4 mm in diameter and the towpreg with a fiber fraction of 30% could be tied into 8 mm knots. Towpreg made from the AR mesophase pitch could be tied into knots 6 mm in diameter at a fiber fraction of 50%.

Figure 7:
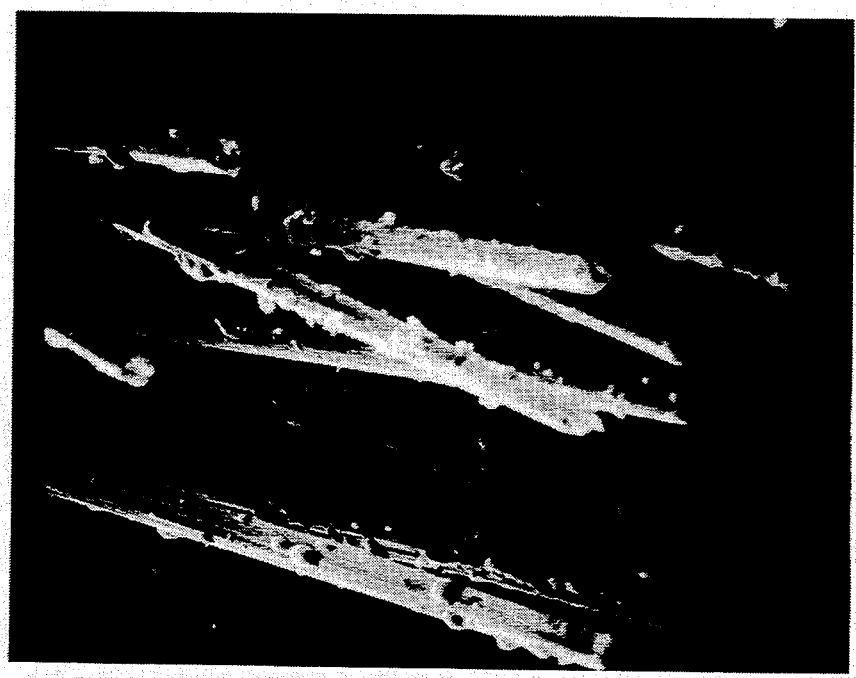
FIG. 7 is an electron micrograph of a towpreg coated with Aerocarb 80 according to the present invention.
Figure 8:
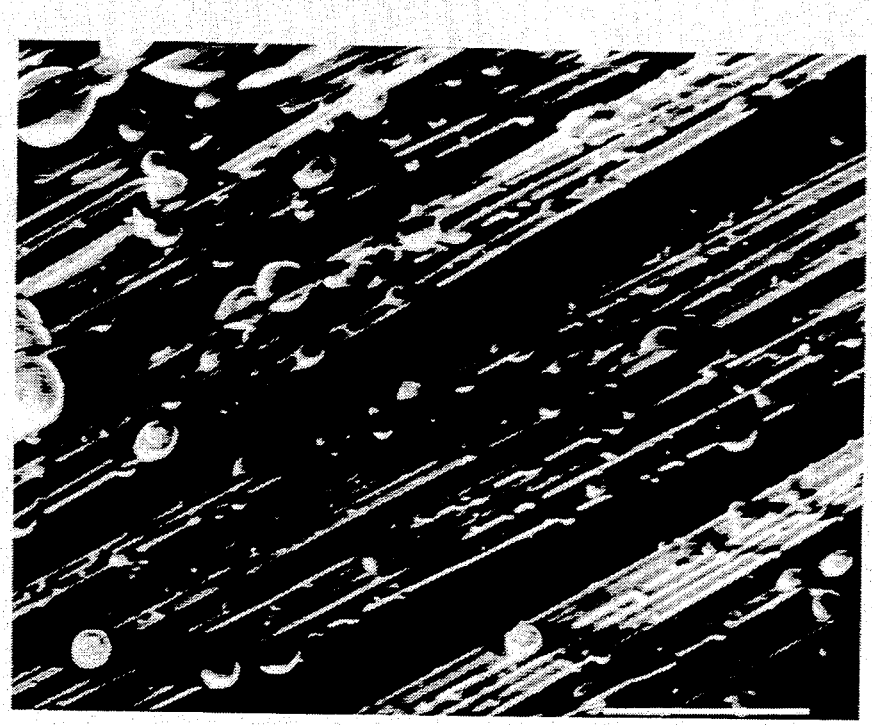
FIG. 8 is an electron micrograph of a towpreg coated with AR mesophase pitch according to the present invention.

The knot test indicated that the towpreg produced hereby should be wearable. This proved to be true, and approximately 200 meters of the AR mesophase pitch-based towpreg was woven into a 2-D cloth. Weavability is a direct result of the uniform and consistent coating of the pitch on the tow produced by this process. Electron micrographs of the towpreg made using the Aerocarb 80 and AR mesophase powders shown in FIGS. 7 and 8 illustrate the coating uniformity and that there was, indeed, individual coating of the filaments. Although FIGS. 7 and 8 indicate that several fibers coalesced together during the coating process, when five, ten, or even twenty fibers were coalesced together in a 6K filament tow, the increased stiffness was negligible, as indicated by the results of the above-described knot test.

plastic deposition of Allen were mottled and non-uniform because moisture caused the 4 mm particles to agglomerate into particles of from about 50 mm to about 100 mm in diameter. When the presently described dried pitch powder was employed during coating, the particles did not agglomerate into large clumps, and a flexible towpreg with a uniform and consistent pitch powder coating was produced. The towpreg produced with dried pitch according to the present process was very flexible, even when coated with up to 70% pitch, a level much greater than that previously attained.

TABLE I

| Towpreg | Tow length [m] | Fan Speed [% of full scale] | Volume Fraction Fiber [%] | # Composites Formed | Comments |
| --- | --- | --- | --- | --- | --- |
| | | | Allen's LaRC-TPI Results | | |
| Overall Average | | 28 | 62.5 ± 5.3 | 8 | mottled, non-uniform, flexible |
| | | | Isotropic Pitch Towpregs | | |
| 1 | 70 | 22 | 49.6 ± 5.6 | 6 | fairly uniform, flexible |
| 2 | 80 | 22 | 51.5 ± 8.6 | 8 | fairly uniform, flexible |
| 3 | 100 | 21 | 43.8 ± 11.7 | 6 | mottled, non-uniform, flexible |
| 4 | 185 dried | 26 | 29.0 ± 6.3 | 4 | uniform, stiff |
| 5 | 100 dried | 26 | 26.8 ± — | 1 | uniform, boardy and stiff |
| 6 | 110 dried | 24 | 44.4 ± 8.1 | 8 | very uniform, very flexible |
| | | | Mesophase Pitch Towpregs | | |
| 1A | 145 dried | 27 | 40.2 ± 4.3 | 12 | very uniform, very flexible |
| 2A | 100 dried | 27 | 36.6 ± 6.4 | 10 | very uniform, very flexible |
| 3A | 110 dried | 26 | — | — | uniform, flexible |
| 4A | 110 dried | 26 | — | — | very uniform, flexible |
| 5A | 135 dried | 28 | 57.0 ± 11.0 | 6 | uniform, very flexible |
| 6A | 135 dried | 26 | 47.7 ± 3.4 | 9 | very uniform, very flexible |
| 7A | 158 dried | 26 | 49.8 ± — | 3 | very uniform, very flexible |

Matrix Adhesion

Proper adhesion of the matrix pitch to the tow is essential if the towpreg is to be woven into preforms. Therefore, during the towpreg fabrication, the degree of adhesion was monitored by two methods. First, the towpreg was examined visually for pitch adhesion by rubbing the towpreg gently between two fingers. The line speed was adjusted so that, when rubbed, most of the pitch adhered to the tow. Typical line speeds ranged from 2 to 4 meters per minute, depending on the oven temperature.

When the residence time in the oven had been adjusted properly to permit the coated tow to pass the rubbing test, the degree of wetting was determined. About 500 filaments having a length of about 5 cm were cut from the moving tow prior to the takeup spool and examined under a microscope to evaluate the degree of wetting. Overall, the line speed was adjusted to optimize the matrix wetting and adhesion to the towpreg. In general, faster line speeds decreased the matrix wetting and adhesion to the tow.

Initial trials indicated that the dry pitch powder yielded a uniform powder coating on the towpreg with little or no clumping. In fact, dried pitch could be used to produce flexible towpregs that were from 60% to 70% pitch by volume. On the other hand, pitch stored at ambient conditions, but not dried, yielded stiff and mottled towpregs. Therefore, prior to coating, the pitch should most advantageously be dried under conditions such as vacuum drying at temperatures ranging from 150° C. to 175° C. for 8 hours.

Towpregs produced by the present process are compared in Table I to the thermoplastic-coated towpregs produced by Allen. Towpregs formed by the thermo- The differences in the towpreg flexibility and uniformity are a direct result of the advantages achieved by the present process wherein an improved powder deposition chamber, powder feeder, tow spreader and a dried powder are used. The high coating levels obtained hereby are advantageous in a woven preform because during densification, the excess resin can be squeezed out of the bundles into the weaving gaps and, thus, reduce voids and densification cycles. Therefore, the towpreg produced hereby is ideal for producing carbon/carbon woven preforms.

Void Characterization

Figure 9:
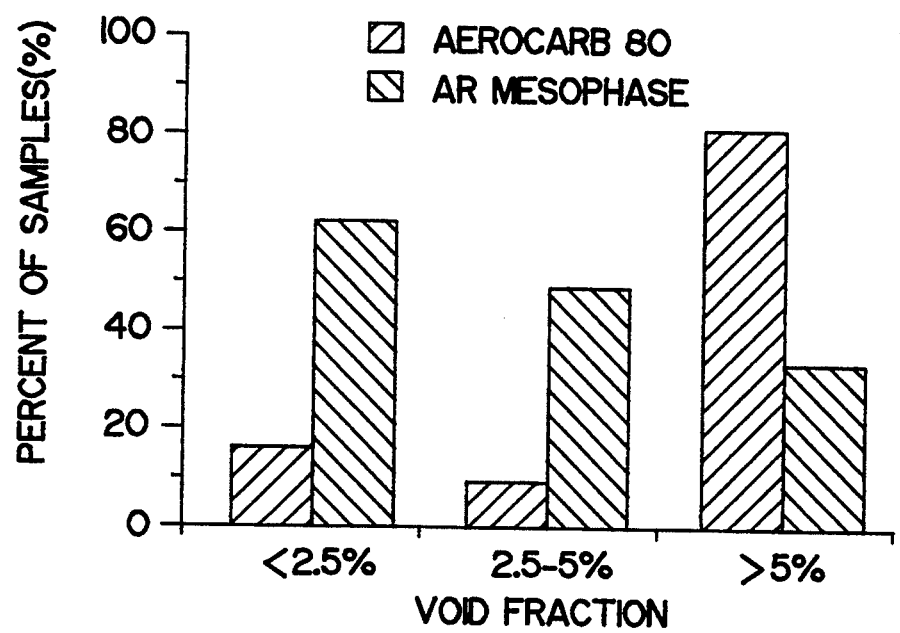
FIG. 9 is a graph illustrating the void content for composites of fiber tows coated with Aerocarb 80 and AR mesophase pitch formed according to the present invention.

Approximately 50% of the green composites produced by the present process exhibited a void content of 5% or less compared to previous processes which produced composites having void contents of between 5% and 13%. Among the other causes of pore formation in green composites discussed above, the most important is matrix volatilization. The isotropic pitch, with a broad molecular weight distribution, contains low molecular weight species that are volatilized at 280° C., causing bubbles and voids. The mesophase pitch, with a higher average molecular weight, does not contain as many low molecular weight species and, thus, the green mesophase composites contained fewer voids. FIG. 9 illustrates the void content for the composites formed from the fiber tows coated with the Aerocarb 80 isotropic and AR mesophase pitch resin employed herein.

Table II shows the actual mass increase of the composites during the oxidation stabilization step. Several composites had a mass gain of approximately 1.1% and several composites had a mass gain of 0.2%, resulting in the high standard deviation.

TABLE II

| Composites | ΔMass [%] | Matrix Carbon Yield [%] | Bulk Density [g/cc] | ΔVolume [%] |
|---|---|---|---|---|
| Aerocarb 80 | | | | |
| Unstabilized | −13.7 ± 4.2 | 62.4 ± 9.9 | 1.13 ± .08 | 5.0 ± 16.0 |
| Stabilized | −8.7 ± 1.4 | 74.8 ± 2.9 | 1.06 ± .13 | 21.1 ± 19.0 |
| AR Mesophase | | | | |
| Unstabilized | −8.55 ± 1.3 | 80.7 ± 2.9 | — | 40.3 ± 7.3 |
| Stabilized | −9.25 ± 2.3 | 79.5 ± 3.6 | 0.89 ± .14 | 52.8 ± 23.0 |

Table III shows the physical properties of the carbonized composites.

TABLE III

| Composite Type | Mass Gain [%] | Standard Deviation [%] |
|---|---|---|
| Aerocarb 80 | 0.54 | ±0.48 |
| AR Mesophase | 0.61 | ±0.41 |

Macroscopic Characterization

Because the composites produced by the present process were unrestrained during carbonization, some bloating was expected. The unstabilized mesophase composites bloated significantly in the lateral direction, whereas the unstabilized isotropic composites expanded more uniformly and to a smaller extent.

Matrix Bloating

The higher matrix carbon yield of the mesophase composites indicated that the mesophase pitch evolved less pyrolysis gas than the isotropic pitch. Thus, the excessive bloating of the mesophase composites compared to that of the isotropic composites showed that mechanisms other than the evolution of pyrolysis gases were responsible for the bloating.

During towpreg formation and composite carbonization with the AR mesophase pitch, a yellowish-brown gas was evolved at temperatures around 300° C. This yellowish-brown gas was observed exiting both the tube furnace of the coating line and the carbonization furnace vent hose. No similar gas evolution was observed when the isotropic pitch was processed. From these observations it was deduced that some lower molecular weight species were given off during the processing of the mesophase pitch. The low temperature of gas evolution indicated that the vapor was not a pyrolysis gas, but an impurity.

Extended graphitic ordered regions parallel to the fiber axis in pitch-based composites increases the modulus of the composite. These extended graphitic regions were observed in micrographs. Neglecting losses due to pyrolysis, a complete conversion of the isotropic pitch to mesophase was observed.

The carbon fibers are believed to act as catalytic surfaces that can transform the isotropic pitch matrix to regions of mesophase. Thus, the layer planes typically grow in a sheath around the fiber, and are confined primarily to the region around individual fibers. This was seen in both the stabilized and unstabilized isotropic specimens. Obviously, the isotropic structure was not locked in during oxidation because even the surface of the composites exhibited some graphitic order.

Similar structural effects also occurred in both the stabilized and unstabilized composites employing mesophase pitch. However, larger regions of extended graphitic structure were observed. The mesophase composites also exhibited a sheath-like matrix orientation around the fibers. In some areas in the composites, the mesophase pitch did not reorient and nucleate around the fibers, and largely random anisotropic areas were observed. These regions, however, were so large that the mesophase could not reorient because there were no fibers in the vicinity to nucleate around. Therefore, there was a complete conversion to a sheath structure where the matrix was in contact with fibers.

Mechanical Characterization

Results of the mechanical testing are illustrated in Table IV which compares the carbon/carbon composites made hereby with those made from traditional melt multi-impregnation processes.

TABLE IV

| Composite | Density [g/cc] | Porosity [%] | Volume Fraction Fiber [%] | Flexural Modulus [GPa] | Flexural Strength [MPa] | Tensile Modulus [GPa] | Tensile Strength [MPa] | Source |
|---|---|---|---|---|---|---|---|---|
| ACC* Phenolic reinforced with high Modulus PAN-based carbon fibers | 1.79 | | | | | 106.0 | 349.0 | 12 |
| RCC* Phenolic reinforced with low Modulus Rayon-based carbon fibers | 1.58 | | | | | 14.5 | 62.5 | 12 |
| T300/HA43+ HA43 Phenolic resin reinforced with PAN-based carbon fibers | | | 50.0 | | 200.0 | | | 22 |
| SIGRAFIL/COAL TAR+ Coal Tar Binder (10% wt. sulfur) with High Modulus SIGRAFIL fibers | 1.1 | | | | 180.0 | | | 22 |
| CARBON FELT/COAL TAR* Coal Tar Binder (20% wt. silicon) with Rayon-based carbon fiber felt | | | | 14.0 | 25.0 | | | 41 |
| CRFC1D+ Phenolic (Novalac T) reinforced with PAN-based carbon fibers | 1.38 | 25.2 | | | | 68.0 | 201.0 | 10 |
| CRFC1D*+ Phenolic (Novalac T) reinforced with | 1.45 | | | | | 175.0 | 1350.0 | 10 |

TABLE IV-continued

| Composite | Density [g/cc] | Porosity [%] | Volume Fraction Fiber [%] | Flexural Modulus [GPa] | Flexural Strength [MPa] | Tensile Modulus [GPa] | Tensile Strength [MPa] | Source |
|---|---|---|---|---|---|---|---|---|
| PAN-based carbon fiber and densified with P-100 coal tar pitch | | | | | | | | |
| MPF3/COAL TAR+ Coal tar reinforced with High Modulus Pitch-based fiber Type III | | | | 80.0 | 450.0 | | 430.0 | 40 |
| MPF2/COAL TAR+ Coal tar reinforced with High Modulus Pitch-based fiber Type II | | | | 25.0 | 75.0 | | 67.0 | 40 |
| T300/PAA+ Polyarylacerylene reinforced with PAN-based carbon fiber | 1.623 | 8.0 | 60.0 | 58.0 | 145.0 | | | 9 |
| T300/P33/PAA+ Polyarylacerylene reinforced with 50% PAN and 50% pitch-based fiber | 1.65 | 9.1 | 60.0 | 45.0 | 161.0 | | | 9 |
| CARBON/PHENOLIC+ Phenolic reinforced with PAN-based carbon fiber | 1.55 | 18.7 | | 11.5 | 68.0 | | | 9 |
| T300/Aerocarb 80 Heat Soaked Isotropic Pitch reinforced with PAN-based fiber | 1.15 | 25.2 | 46.0 | 101.5 | 113.3 | | | |
| T300/Aerocarb 80/Stabilized Stabilized Heat soaked isotropic pitch reinforced with PAN-based fiber | 1.15 | 30.7 | 54.1 | 97.3 | 116.9 | | | |
| T300/AR Mesophase 100% mesophase pitch reinforced with PAN-based carbon fiber | 0.85 | 50.5 | 46.1 | 66.7 | 117.5 | | | |

*DENOTES A DENSIFIED COMPOSITE
+DENOTES A UNIDIRECTIONAL COMPOSITE

The results demonstrate that the isotropic composites had a higher flexural modulus than their mesophase counterparts. This was most likely due to the higher void content of the mesophase composites and does not necessarily indicate that the isotropic pitch yields higher modulus composites. If the flexural modulus is plotted as a function of density, which decreases as the void content increases, the detrimental effect of voids on observed modulus becomes obvious. However, when the flexural strength is plotted against density, no change in observed strength is seen. This is probably because strength is a flaw-limited property and, thus, one would expect that the strength would be nearly the same for all composites because it is primarily a fiber property in carbon/carbon composites.

The values of flexural modulus and flexural strength measured for the composites produced during this research are comparable to those reported in the literature. Because the composites made in the current research did not require multiple impregnations, these moduli and strength results indicate that a pitch-coated towpreg can be used to form thick-section carbon/carbon composites with excellent initial mechanical properties.

These results indicate that through the present process, carbon/carbon composites can be made with significantly less porosity on first carbonization, i.e., less than 5% porosity, which would yield even higher composite properties. Therefore, it may be desirable to carbonize the composites in a restrained fashion and, thereby, inhibit bloating.

In summary, the present process allows impregnations of a carbon fiber tow with both isotropic and mesophase pitches. The flexibility of the coated tow approaches that of the uncoated tow, thus allowing the coated carbon/carbon towpreg to be woven into a pre-impregnated fabric for use in pre-impregnated woven carbon/carbon structures. The improved method of spreading the fiber tow allows a higher coating of the powder onto the fibers while maintaining the high flexibility of the tow. The resultant fibers may be subjected to carbonization to produce composites with high flexural properties and low bulk densities. In addition, it was discovered that both isotropic and mesophase pitches may be completely converted to a sheath-like matrix microstructure around the carbon fiber tow which also contributes to the improved flexural moduli of the composites. Such high mechanical properties and low density characteristics of the composites produced according to the present inventive process allow the manufacture of textile preforms for thick-walled carbon/carbon composites.

It should be understood that the present invention is not limited to the specific compositions, composites, processes or parameters described herein and that any method and apparatus equivalent to those described falls within the scope of the present invention. Preparation routes and process steps are merely exemplary so as to enable one of ordinary skill in the art to make the composites and coated fibers and use them according to the described process and its equivalents. It will also be understood that although the form of the invention shown and described herein constitutes a preferred embodiment of the invention, it is not intended to illustrate all possible forms of the invention. The words used are words of description rather than of limitation. Various changes and variations may be made to the present invention with departing from the spirit and scope of the following claims.

We claim:

1. A process for coating carbon fibers comprising the steps of:

a) providing a carbon fiber tow to a pressurized air comb spreader, said air comb spreader including a tow spreading chamber having an entrance and an exit for said fiber tow, wherein air is forced in through a plurality of air comb slits for intersecting said fiber tow in a substantially perpendicular direction as said fiber tow moves from said entrance to said exit to spread said carbon fiber tow into substantially individual fiber filaments to create a spreaded fiber tow;

b) providing said spreaded fiber tow to a powder coating chamber for depositing a pitch material onto said substantially individual carbon fiber filaments;

c) depositing said pitch material onto said carbon fiber filaments to form a pitch-coated carbon fiber tow by providing said pitch material in dry powdered form to an upper portion of said fiber coating chamber, said dry pitch powder being provided to said coating chamber at a point of low air velocity so that said pitch powder falls onto said spreaded fiber tow traveling through said powder coating chamber prior to said pitch powder entering into a region of high air velocity within said coating chamber and being recirculated back to a region of low air velocity in said coating chamber; and d) providing said pitch-coated carbon fiber tow for further processing.

2. A process for forming a carbon/carbon composite comprising the steps of:

a) providing a carbon fiber tow to a pressurized air comb spreader, said air comb spreader including a tow spreading chamber having an entrance and an exit for said fiber tow, wherein air is forced in through a plurality of air comb slits for intersecting said fiber tow in a substantially perpendicular direction as said fiber tow moves from said entrance to said exit to spread said carbon fiber tow into substantially individual fiber filaments to create a spreaded fiber tow;

b) providing said spreaded fiber tow to a powder coating chamber for depositing a pitch material onto said substantially individual carbon fiber filaments;

c) depositing said pitch material onto said carbon fiber filaments to form a pitch-coated carbon fiber tow by providing said pitch material in dry powdered form to an upper portion of said fiber coating chamber, said dry pitch powder being provided to said coating chamber at a point of low air velocity so that said pitch powder falls onto said spreaded fiber tow traveling through said powder coating chamber prior to said pitch powder entering into a region of high air velocity within said coating chamber and being recirculated back to a region of low air velocity in said coating chamber;

d) providing said pitch-coated carbon fiber tow for further processing; and e) forming said pitch-coated carbon fiber tow into a carbon/carbon composite by subjecting said pitch-coated tow to carbonization.

3. The process as defined in claim 2 further comprising the step of subjecting said pitch-coated fiber tow to an oxidative stabilization prior to carbonization of said composite.

4. The process as defined in claim 1, wherein said carbon fiber tow travels along a roughened surface in said pressurized air-comb spreader to improve said spreading of said carbon fiber tow into substantially individual fiber filaments.

5. The process as defined in claim 1, wherein said fiber coating chamber has glass walls to decrease the static charges present in said fiber tow and to decrease the formation of carbon flakes on the interior of said powder coating chamber.

6. The process as defined in claim 1, wherein said pitch material is chosen from the group consisting of isotropic pitch and mesophase pitch.

7. The process as defined in claim 1, wherein said further processing comprises the formation of a carbon/carbon composite from said pitch-coated carbon fiber tow.

8. In a process for coating carbon fibers wherein a carbon fiber tow is spread into substantially individual fiber filaments to create a spreaded fiber tow and wherein said spreaded fiber tow is subjected to a powder coating chamber during which a pitch material is deposited onto said fiber filaments, the improvement comprising:

providing a carbon fiber tow to a pressurized air comb spreader, said air comb spreader including a tow spreading chamber having an entrance and an exit for said fiber tow, wherein air is forced in through a plurality of air comb slits for intersecting said fiber tow in a substantially perpendicular direction as said fiber tow moves from said entrance to said exit to spread said carbon fiber tow into substantially individual fiber filaments to create a spreaded fiber tow.

9. The process as defined in claim 8, wherein said carbon fiber tow travels along a roughened surface in said pressurized air comb spreader to further improve said spreading of said carbon fiber tow into substantially individual fiber filaments.

10. The process as defined in claim 1, further comprising the step of providing said pitch-coated carbon fiber tow to a tube furnace for heating said pitch-coated carbon fiber tow and for fusing said pitch powder to said carbon fiber filaments.

* * * * *